(12) United States Patent
YangGong et al.

(10) Patent No.: US 10,296,063 B2
(45) Date of Patent: May 21, 2019

(54) INTEGRATED CIRCUIT CURRENT METERING USING VOLTAGE VARIATION DETECTION CIRCUIT

(71) Applicant: Oracle International Corporation, Redwood City, CA (US)

(72) Inventors: Yifan YangGong, Milpitas, CA (US); Sebastian Turullols, Los Altos, CA (US); Vijay Srinivasan, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 103 days.

(21) Appl. No.: 15/474,635

(22) Filed: Mar. 30, 2017

(65) Prior Publication Data

US 2018/0284867 A1  Oct. 4, 2018

(51) Int. Cl.
*G06F 1/324* (2019.01)
*G06F 1/3206* (2019.01)
*G06F 1/3296* (2019.01)

(52) U.S. Cl.
CPC ............ *G06F 1/3206* (2013.01); *G06F 1/324* (2013.01); *G06F 1/3296* (2013.01)

(58) Field of Classification Search
CPC ....... G06F 1/3206; G06F 1/324; G06F 1/3296
See application file for complete search history.

(56) References Cited

U.S. PATENT DOCUMENTS

| 5,153,489 A | 10/1992 | Unsworth |
| 6,031,777 A | 2/2000 | Chan |
| 8,004,351 B2 | 8/2011 | Ikenaga |
| 8,013,589 B2 | 9/2011 | Okada |
| 8,030,956 B2 | 10/2011 | Otsuga |
| 2006/0152205 A1* | 7/2006 | Tang .................... H02M 3/1584 323/284 |
| 2015/0378411 A1* | 12/2015 | Grenat ............... G01R 19/0084 713/340 |
| 2017/0070212 A1* | 3/2017 | Kultran .................. H03H 19/00 |

* cited by examiner

*Primary Examiner* — Austin Hicks
(74) *Attorney, Agent, or Firm* — Meyertons, Hood, Kivlin, Kowert & Goetzel, P.C.

(57) ABSTRACT

An apparatus is disclosed, including a monitoring circuit, a translation circuit, a first filter circuit, a second filter circuit, and an interface. The monitoring circuit may be configured to receive a plurality of code values indicative of a voltage level of a power supply signal. The translation circuit may be configured to translate a particular code value to a corresponding voltage value of a plurality of voltage values. The first filter circuit may be configured to filter one or more of the plurality of voltage values to generate a plurality of filtered voltage values. The second filter circuit may be configured to generate a plurality of current values using one or more of the plurality of filtered voltage values and based on an impulse response of the power supply signal. The interface may be configured to send one or more of the plurality of current values to a functional circuit.

20 Claims, 6 Drawing Sheets

INTEGRATED CIRCUIT CURRENT METERING USING VOLTAGE VARIATION DETECTION CIRCUIT

BACKGROUND

Technical Field

The embodiments disclosed within relate to computing systems, and more particularly, to monitoring current in an integrated circuit.

Description of the Related Art

Integrated circuits (ICs), such as, for example, systems-on-a-chip (SoCs) or processor units, may be used in various computing systems, such as, for example desktop computers, laptop computers, database servers, cloud computing servers, network switches, and the like. Power consumption of these computing systems may be monitored for various reasons. For example, power consumption of an IC in a laptop computer may be monitored to assess the IC's impact on battery life. An IC in a database or cloud computing server may be monitored to assess the IC's impact on heat generated in the server.

ICs may place variable loads on a power supply circuit providing power to the IC. As an IC transitions between periods of time of high activity and low activity, a current consumed by the IC may transition between corresponding periods of high current consumption and low current consumption. In some computing systems, current consumed by one or more ICs may be tracked and used to determine an up-to-date current load being placed on a power supply.

SUMMARY

Various embodiments of an apparatus and a method for implementing and managing a communication link are disclosed. Broadly speaking, an apparatus is contemplated in which the apparatus may include a monitoring circuit, a translation circuit, a first filter circuit, a second filter circuit, and an interface. The monitoring circuit may be configured to receive a plurality of code values indicative of a voltage level of a power supply signal included in a power distribution network of an integrated circuit. The translation circuit may be configured to translate a particular code value of the plurality of code values to a corresponding voltage value of a plurality of voltage values. The first filter circuit may be configured to filter one or more of the plurality of voltage values to generate a plurality of filtered voltage values. The second filter circuit may be configured to generate a plurality of current values using one or more of the plurality of filtered voltage values and based on an impulse response of the power supply signal. The interface may be configured to send one or more of the plurality of current values to a functional circuit.

In a further embodiment, the translation circuit may be further configured to translate the particular code value using a temperature value. In one embodiment, the apparatus may include a memory. The first filter circuit may be further configured to retrieve at least one coefficient value from the memory and filter the one or more of the plurality of reduced rate voltages using the at least one coefficient value.

In another embodiment, the first filter circuit may include a finite impulse response filter. The at least one coefficient value may be based on a cutoff frequency associated with the power supply signal. In an embodiment, the apparatus may include a memory. The second filter circuit may be further configured to retrieve data indicative of the impulse response of the power supply signal from the memory and generate the plurality of current values using the data.

In a further embodiment, the second filter circuit may include a finite impulse response filter. The data indicative of the impulse response may also be indicative of an inverse convolution relationship between the voltage level of the power supply signal and an amount of current sourced by the power supply signal. In one embodiment, the functional circuit may be configured to modify at least one operating parameter based on the subset of the plurality of current values.

Figure 1:
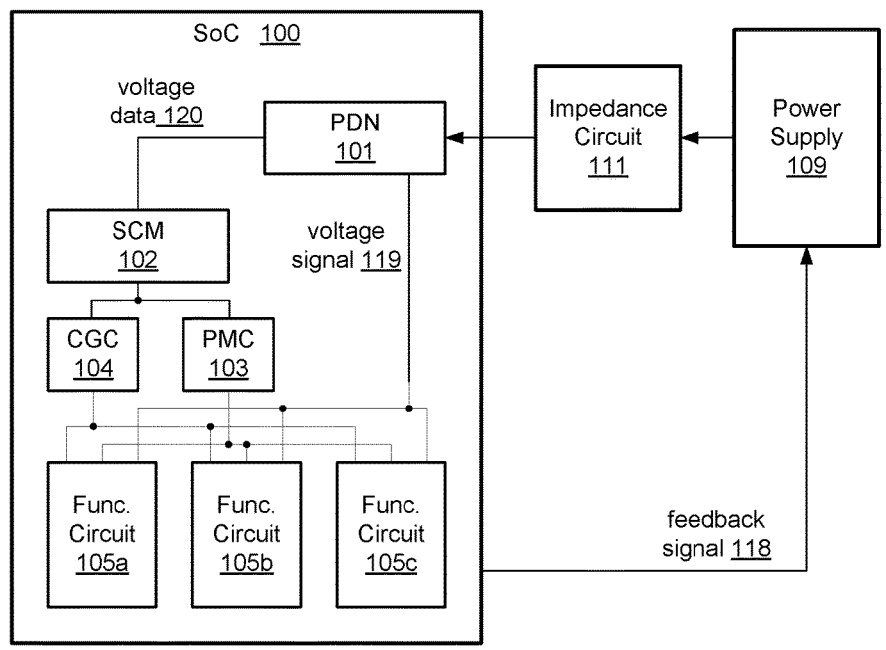
FIG. 1 illustrates a block diagram of an embodiment of a system including a system-on-a-chip (SoC), a power supply, and an impedance circuit.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Current consumption of SoCs or processor units may be monitored for a variety of uses. For example, high current consumption may place stress on a power source or may lead to increasing temperatures of a computing system. By identifying an increase in current consumption or a high current consumption for an extended amount, a processor in a computing system may be able to adjust an operating condition to mitigate the current consumption and possibly avoid a condition that could lead to a fault in the computing system.

Current may be measured in various ways. For example, a known impedance may be included in a power supply signal's path and a voltage drop across this impedance may indicate an amount of current flowing through the path. This method, however, may require having an accurate value for the impedance in order to make accurate current measurements, and such accuracy may be costly or difficult to manufacture consistently.

Some processors are powered from a power signal from a voltage or current regulating circuit. Some regulating circuits, such as, for example, switching regulators, generate an output signal with a lower voltage level than a source signal by repeatedly coupling, and then de-coupling, an output signal node to the source signal. Each occurrence of coupling the output node to the source signal may produce a current pulse onto the output node. A power distribution circuit may generate a voltage signal from a series of the current pulses from the regulating circuit. In some embodiments, the power distribution circuit may include circuits that implement a transfer function to generate a particular voltage level based on the amount of current received via the series of current pulses. The relationship between the particular voltage level and the current pulses may be referred to as an "impulse response." An amount of current may be determined if the transfer function of the impulse response and a voltage level are known. Embodiments disclosed herein may demonstrate systems and methods for determining a current using values of a voltage level and an inverse of a transfer function used by a voltage generation circuit.

FIG. 1 illustrates a block diagram of an embodiment of a system including a system-on-a-chip (SoC), a power supply, and an impedance circuit. In the illustrated embodiment, the system includes SoC 100 coupled to impedance circuit 111, which, in turn, is coupled to power supply 109. SoC 100 includes power distribution network (PDN) 101 coupled to SoC current monitor (SCM) 102. SCM 102 is further coupled to clock generation circuit (CGC) 104 and power management controller (PMC) 103. SoC 100 further includes several functional circuits 105a through 105c.

Power supply 109 may correspond to any suitable circuit for supplying a power signal to SoC 100. In the illustrated embodiment, power supply 109 corresponds to a switching voltage regulator capable of providing one or more current signals with a suitable average voltage level. Switching voltage regulators may produce a current signal with a voltage level that periodically rises above and then falls below the average voltage level as a power source is switched on and off, also referred to herein as power supply "ripple." Impedance circuit 111, in the illustrated embodiment, includes components such as, for example, resistors, capacitors, and inductors that may provide some compensation for the power supply ripple. In addition, impedance circuit 111 may provide storage for excess charge when current demand from SoC 100 is low and then source the stored charge as current to SoC 100 when the current demand is high. Impedance circuit 111 may, however, slow a response time from power supply 109 to changes in current demand from SoC 100. The slowed response time may cause voltage level drops in response to sudden increases in current consumption of SoC 100, or voltage level peaks in response to sudden decreases in current consumption.

Feedback signal 118 is sent to power supply 109 from SoC 100. A voltage level of feedback signal 118 may provide an indication to power supply 109 of how much current SoC 100 is using at a given point in time. Power supply 109 may then use this feedback to adjust the current signals sent to SoC 100. Using feedback signal 118, power supply 109 may be capable of maintaining an adequate amount of charge stored in impedance circuit 111 to prevent SoC 100 from being current starved, which could result in faulty operation of SoC 100. Feedback signal 118, may not, however, capture smaller fluctuations in current consumption in SoC 100 that could be useful for determining if SoC 100 is consuming an unsafe amount of current that could lead to a rise of die temperature to a point at which SoC fails to operate efficiently or correctly.

SoC 100, in the illustrated embodiment, corresponds to an IC that includes circuits for distributing and managing power signals and clock signals to a plurality of functional circuits 105a-105c (collectively referred to as 105) also included in SoC 100. PDN 101 receives at least one power signal from power supply 109, via impedance circuit 111. The power signal includes a current that PDN 101 uses to generate one or more voltage signals, including voltage signal 119, for distribution throughout SoC 100. PDN 101 distributes voltage signal 119 to one or more functional circuits 105. The voltage level of the voltage signal 119 may fluctuate based on a process for generating voltage signal 119 from the received current as well as from changes in power consumption by functional circuits 105 as activity in functional circuits 105 that are coupled to voltage signal 119 change over time.

SCM 102 receives voltage data 120 from PDN 101 that, in the illustrated embodiment, corresponds to coded values indicative of the voltage level of voltage signal 119. Values of voltage data 120 may be based on the voltage generation process used by PDN 101 to generate voltage signal 119. SCM 102 may receive a series of these coded values that each correlate to a voltage level of voltage signal 119 at a particular point in time. This series of coded values is translated into a series of voltage values, which are then processed through a decimation filter, and then an inverse convolution filter to produce a series of current values that correlate to the current consumption of some or all of the circuits coupled to voltage signal 119. The series of current values may reflect power consumption in SoC 100 over a period of time. SCM 102 may send one or more of the current values to PMC 103, CGC 104, and/or any of functional circuits 105. Further details of SCM 102 are disclosed below.

PMC 103, in the illustrated embodiment, controls power modes for various circuits in SoC 100, such as, for example, functional circuits 105. PMC 103 may determine which power mode each of functional circuits 105 enters. For example, PMC 103 may indicate that functional circuit 105a is in a reduced power state, while indicating that functional circuits 105b and 105c are in active states. If functional circuit 105a is needed, then PMC 103 may switch functional circuit 105a to the active state. In some embodiments, PMC 103 may de-couple functional circuit 105a from the voltage signal 119, thereby powering functional circuit 105a down, a process referred to herein as "power gating."

CGC 104 generates one or more clock signals in the illustrated embodiment and distributes the clock signals to functional circuits 105. PDN 101, SCM 102 and PMC 103 may also receive one or more clock signals from CGC 104. In addition, CGC 104 may adjust a frequency of any of the one or more clock signals, reducing a frequency of a particular clock signal at times when circuits using the particular clock signal are inactive, and vice versa. Similar to PMC 103, CGC 104 may disable or block a particular functional circuit 105 from receiving a clock signal when the particular functional circuit 105 is inactive, a process referred to herein as "clock gating."

PMC 103 and CGC 104 may use the current values received from SCM 102 to determine if and when to clock gate or power gate one or more functional circuits 105 in response to a present level of current consumption. For example, in response to a determination that current consumption is rising to or exceeding an upper threshold of current consumption for SoC 100, PMC 103 and/or CGC 104 may power gate or clock gate inactive functional circuits to allow more current to be available for active circuits. For example, SoC 100 may have a typical operating current of 500 milliamps (mA) with a maximum rating of 1 amp (A). An upper threshold may be set at 800 mA or 900 mA such that power gating or clock gating may be activated before the current consumption reaches the 1 A maximum rating. In other embodiments, the upper threshold may be set using other considerations, such as, e.g., an amount of current a power supply is capable of providing, or a thermal characteristic of the SoC related to current consumption. In some cases, CGC 104 may, instead of clock gating, reduce a frequency of clock signals to less active functional circuits 105 or to functional circuits 105 that are active but processing lower priority tasks, thereby allowing more current for higher priority tasks. In some embodiments, CGC 104 may reduce a frequency of signals to all functional circuits until a determination is made that the current consumption has dropped below the upper threshold.

Functional circuits 105 may correspond to any suitable circuits included in an SoC. For example, functional circuits 105 may include any combination of processor cores, cache memories, networking interfaces, memory interfaces, communication modules, and the like. Although three functional circuits are shown for clarity, any number of functional circuits may be used in various embodiments.

It is noted that the embodiment of the system illustrated in FIG. 1 is merely one example. In other embodiments, different numbers and configurations of circuits are possible and contemplated.

Figure 2:
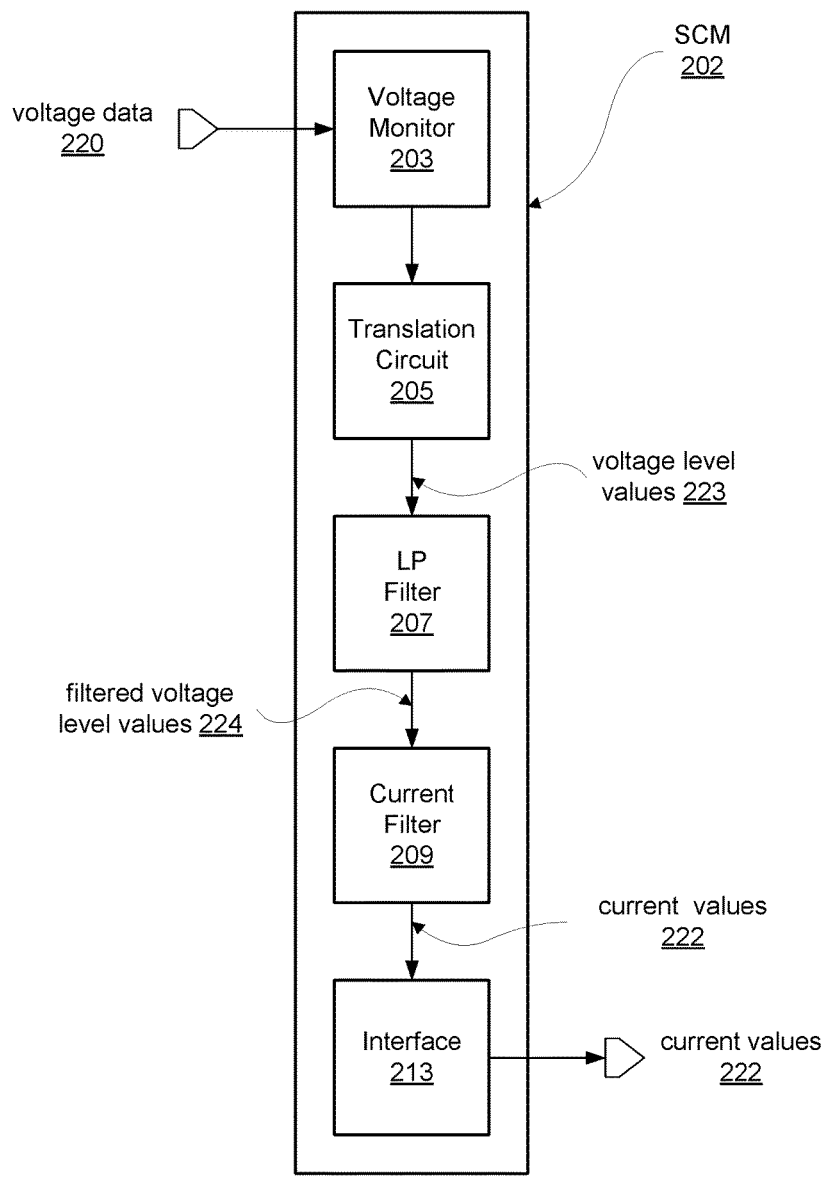
FIG. 2 shows a block diagram of an embodiment of an SoC current monitoring circuit.

Turning now to FIG. 2, a block diagram of an embodiment of an SoC current monitoring circuit is shown. SCM 202 may correspond to an embodiment of SCM 102 in FIG. 1. SCM 202 includes voltage monitor 203 coupled to translation circuit 205, which, in turn, is coupled to low pass (LP) filter 207. LP filter 207 is coupled to current filter 209, which is then coupled to interface 213. Voltage monitor 203 receives voltage data 220 as input and interface 213 sends current value 222 as output.

Similar to the description above regarding SCM 102 in FIG. 1, SCM 202, in the illustrated embodiment, receives values, in the form of voltage data 220, from PDN 101. Voltage data 220 may include coded values indicative of a voltage level of a voltage signal generated by PDN 101, such as, for example, voltage signal 119. In various embodiments, voltage monitor 203 receives voltage data 220 as a serial stream of data bits, a parallel data input across multiple wires, or any suitable combination thereof. The coded values are received periodically at a particular sampling rate. For example, in one embodiment, voltage data 220 may provide coded values at a sampling rate of 2.2 gigahertz (GHz), or 1 coded sample provided approximately every 455 picoseconds (psec). Voltage monitor 203 provides the received coded values to translation circuit 205.

In the illustrated embodiment, translation circuit 205 includes a memory for storing entries for converting the coded values received from voltage monitor 203 into voltage level values 223, corresponding to voltage levels of voltage signal 119. In addition to the memory, translation circuit 205 may also include logic circuits for receiving the coded values from voltage monitor 203 as well as additional data, such as environmental or operational conditions, for example, or data corresponding to a current operating temperature. Using an appropriate entry in the memory, translation circuit 205 produces a value representing a voltage level for each coded value received. Voltage level values 223 are sent to LP filter 207.

LP filter 207, in one embodiment, receives voltage level values 223 from translation circuit 205 and filters out values that represent high frequency changes in the level of voltage signal 119. For example, a large change in the values between two or more successively received voltage level values 223 may correspond to a short-term switching noise or other type of noise on voltage signal 119. If values for current that reflect longer term power consumption usage, rather than short term spikes in consumption, are desired, then a low pass filter may be used to attenuate short term changes and better represent longer term power usage in the SoC. LP filter may employ a particular cutoff frequency, attenuating rapid changes associated with frequencies that are higher than the cutoff frequency and, instead, returning voltage level values 223 corresponding to the longer-term power consumption.

In some embodiments, LP filter 207 may additionally be used to decimate the sampling rate of voltage data 220. Continuing with the previous example in which a sampling rate of 2.2 GHz is employed, this sampling rate results in 2200 samples every microsecond. While this sampling rate may be used for some tasks, this may provide more data samples than needed for determining current consumption. Decimation of voltage level values 223 may include using a particular number of successive values to generate one filtered voltage level value. LP filter 207 generates a number of filtered voltage level values 224 based on a decimation factor or ratio. For every particular number of voltage level values 223 received, LP filter 207 generates one filtered voltage level value. For example, LP filter 207 may be designed for a decimation factor of 16, or 32, or any other suitable number. In regards to the above-referenced example, a decimation factor of 22 may be used, resulting in 100 filtered voltage level values 224 generated every microsecond. These filtered voltage level values 224 are sent to current filter 209.

Current filter 209, in the illustrated embodiment, receives filtered voltage level values 224 and generates corresponding current values 222. Current filter 209 includes a finite impulse response (FIR) filter to generate current values 222. The FIR filter uses multiple coefficients that are multiplied, one at a time, by the received filtered voltage level values 224 and then added to a total value. The coefficients may be determined based on several factors corresponding to the generation of voltage signal 119 from signals received from power supply 109. For example, referring to FIG. 1, the factors may include a process used by power supply 109 to generate a power signal, the arrangement and values of components used in impedance circuit 111, and/or a process used in PDN 101 to generate voltage signal 119. For example, PDN 101 may utilize a convolution formula based on the relationship between impedance in the power signal path (e.g. impedance circuit 111) and current to determine a voltage level at which to set voltage signal 119. Current filter 209 may utilize an inverse of this convolution formula to determine a current value 222 for a given filtered voltage level value 224 and based on a known impedance. Additional details of the operation of a FIR-based current filter are disclosed later.

Current values 222 are sent by current filter 209 to interface 213 to be distributed to appropriate circuits. Interface 213, in various embodiments, may include a wire coupled to the appropriate circuits, or may include one or more registers and a data bus interface. Each current value 222 may be sent to all appropriate circuits in parallel or may be address to one or more particular circuits.

The embodiment of SCM 202 illustrated in FIG. 2 is merely an example for demonstrative purposes. Various functional circuit blocks have been omitted for clarity. In various embodiments, different functional circuit blocks may be included and are contemplated. Furthermore, FIG. 2 merely illustrates logical arrangement of the various circuit blocks and is not intended to demonstrate a physical layout of the illustrated circuit blocks.

Figure 3:
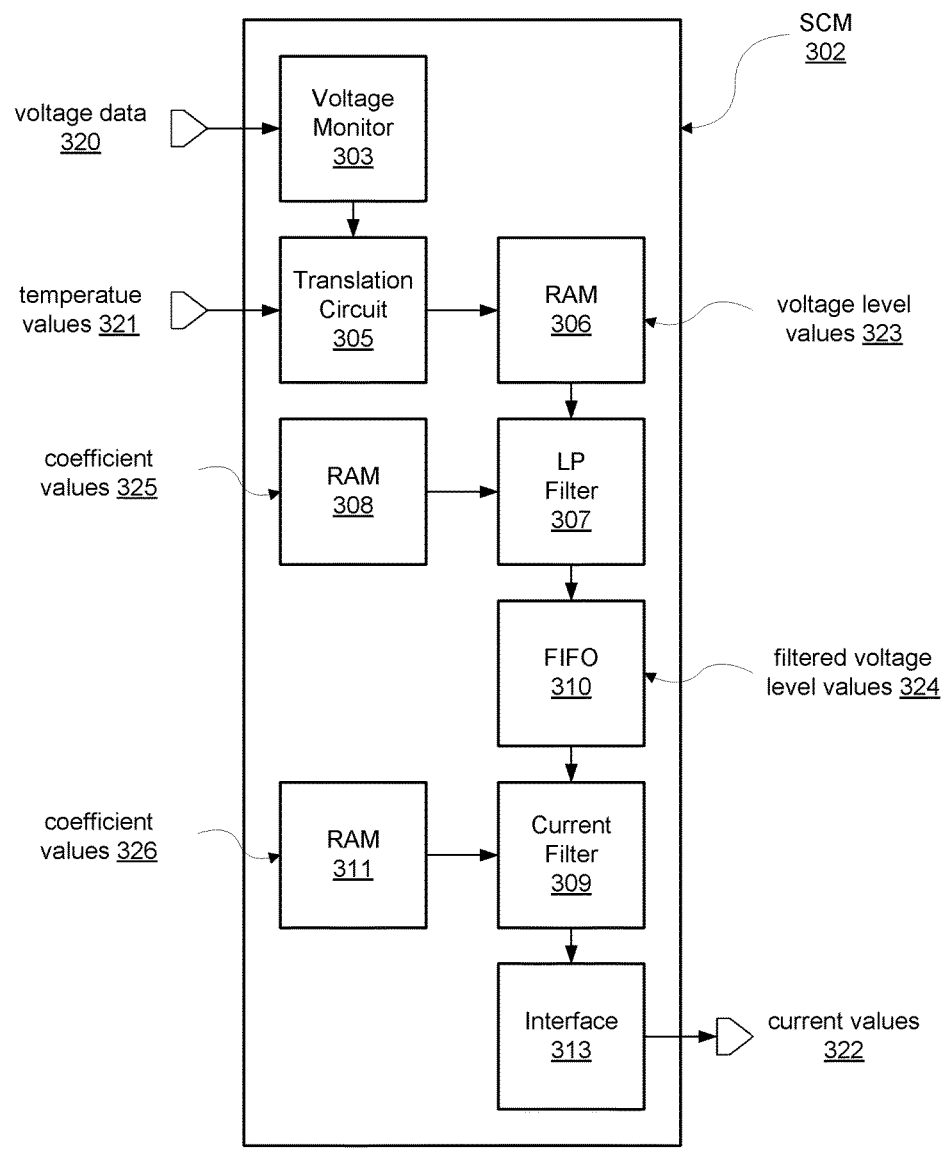
FIG. 3 is a block diagram depicting another embodiment of an SoC current monitoring circuit.

Moving now to FIG. 3, a block diagram depicting another embodiment of an SoC current monitoring circuit is shown. SCM 302, similar to SCM 202 in FIG. 2, may correspond to an embodiment of SCM 102 in FIG. 1. SCM 302 includes voltage monitor 303 coupled to translation circuit 305, which, in turn, is coupled to random access memory (RAM) 306. Low pass (LP) filter 307 is coupled to RAM 306, RAM 308 and first-in, first-out (FIFO) buffer 310. Current filter 309 is coupled to FIFO buffer 310, to RAM 311 and to interface 313. Voltage monitor 303 receives voltage data 320 as input, translation circuit 305 receives temperature values 321 as input. Interface 313 sends current value 322 as output.

SCM 302, in the illustrated embodiment, includes some similar circuits to SCM 202. Similarly named and numbered circuit blocks in FIG. 3 perform as described above in regards to FIG. 2, except as disclosed below. Voltage monitor 303 receives values, in the form of voltage data 320, from a power distribution network, such as, e.g., PDN 101 in FIG. 1 at a particular sampling rate. The values of voltage data 320 are passed into translation circuit 305 to be transformed into voltage level values 323. Translation circuit 305 receives temperature values 321 from a temperature sensor elsewhere in SoC 100, or external to SoC 100. Based on values of a present temperature value 321 and voltage data 320, an entry stored in translation circuit 305 is read. In various embodiments, the read entry may correspond to a present voltage level value 323, or the read entry may be combined with the present voltage data to calculate the corresponding present voltage level value. The corresponding voltage level value is stored in RAM 306.

LP filter 307 reads the stored voltage level values 323 from RAM 306, as well as coefficient values 325 from RAM 308. As described for LP filter 207, LP filter 307 attenuates voltage level values that indicate rapid changes corresponding to a frequency greater than a cutoff frequency of LP filter 307. In the illustrated embodiment, LP filter 307 includes a decimation filter designed to attenuate high frequency variations in voltage level values 323. In addition, the decimation filter reduces a sampling rate of voltage level values by generating one filtered voltage level value 324 for every predetermined number of read voltage level values 323. As previously disclosed herein, a decimation factor, or decimation ratio, determines how many values of voltage level values 323 are used to determine one value of filtered voltage level values 324. In one example, a decimation ratio of 22 may be used such that 22 values of voltage level values 323 are used to determine one value of filtered voltage level values 324. In some embodiments, the decimation filter may include multiple stages. Filtered voltage level values 324 may be stored into FIFO buffer 310 after they are generated by LP filter 307.

In the illustrated embodiment, RAM 308 may be loaded with coefficient values 325 upon a power-on event or an assertion of a reset signal. Coefficient values 326 may remain constant, unless updated by a software or firmware update to a system memory of a computing system that includes SCM 302. Coefficient values 325 may remain in the same location in RAM 308 throughout the operation of SCM 302.

Current filter 309, as described above for current filter 209, generates current values 322 based on filtered voltage level values 324. In the illustrated embodiment, current filter 309 uses a FIR filter to implement an inverse convolution function that determines current values 322 based on a voltage level and a known impedance value. RAM 311 may be used to store coefficient values 326 that relate to the inverse convolution function. Current filter 309 reads one or more filtered voltage level values 324 from FIFO buffer 310 and a corresponding number of coefficient values 326 from RAM 311. A read coefficient may be combined with a read filtered voltage level value to generate a respective term. A number of generated terms may then be combined together to generate a current value 322. For example, in one embodiment, 512 generated terms may be used to generate each current value 322. Upon generating a current value 322, current filter 309 sends the value to interface 313, similar to as described above for interface 213.

In the illustrated embodiment, filtered voltage level values 324 stored in FIFO buffer 310 are shifted in a memory array of FIFO buffer 310 after each read. For example, a first filtered voltage level value 324 read from location N in the memory will be written back into location N+1. Similarly, a second filtered voltage level value 324 read from location N−1 is written back into location N at the same time that the first filtered voltage level value 324 is written back into location N+1. The shifting of data occurs upon receiving a new filtered voltage level value 324. The oldest filtered voltage level value 324 (e.g., the value that has been in FIFO buffer 310 for the longest amount of time and is in the last location in the memory) may be discarded upon receiving a new filtered voltage level value 324. Each received filtered voltage level value 324 may be read and used to generate multiple terms before it is discarded.

Coefficient values 326, in contrast to values in FIFO buffer 310, may remain in the same location in RAM 311 throughout the operation of SCM 302. In the illustrated embodiment, RAM 311 may be loaded with coefficient values 326 upon a power-on event or an assertion of a reset signal. Similar to coefficient values 325, coefficient values 326 may remain constant unless updated through a software or firmware update to a system memory.

The example depicted in FIG. 3 is merely one embodiment. In other embodiments, additional circuit blocks may be included. The illustrated circuit blocks may be arranged in another order in some embodiments.

Figure 4:
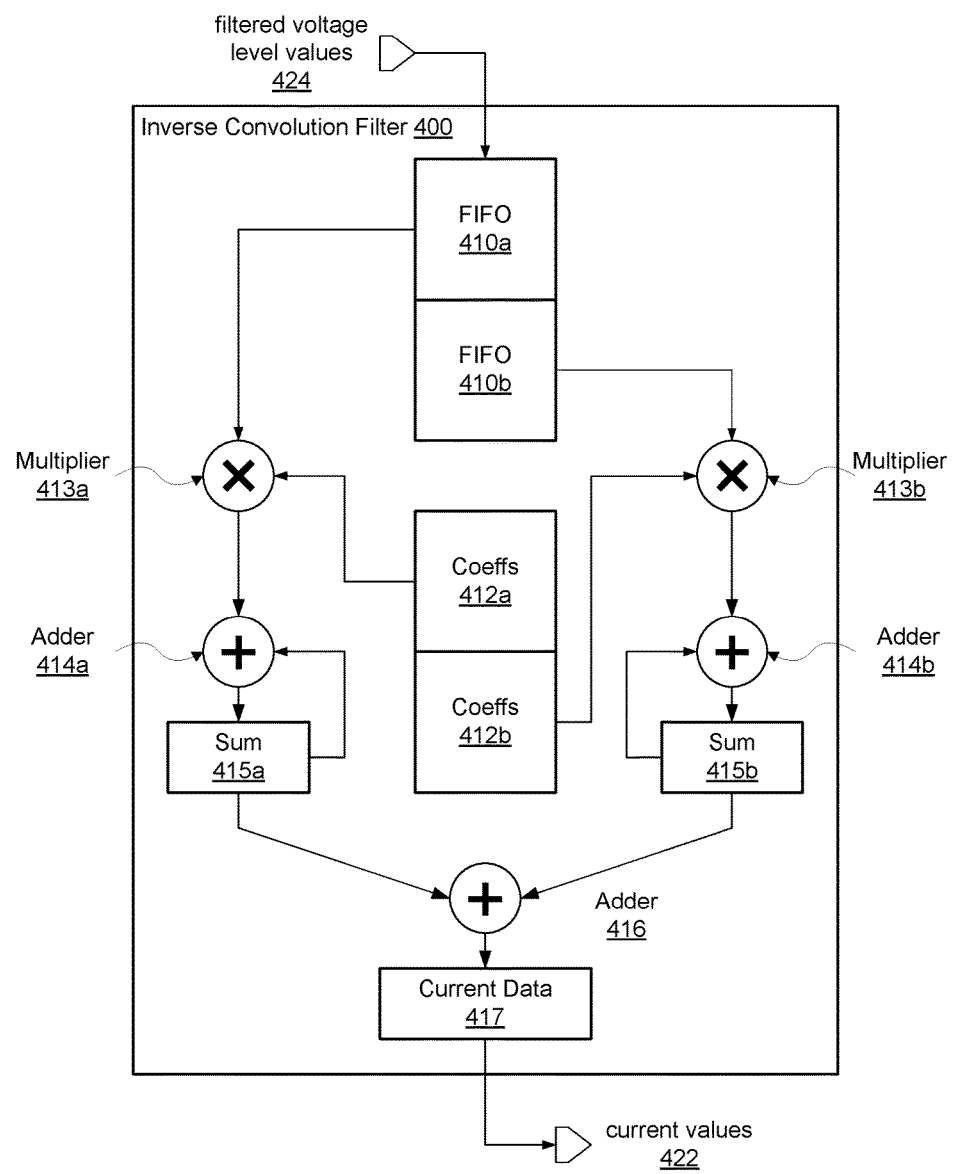
FIG. 4 illustrates block diagram of an embodiment of an inverse convolution filter.

Turning to FIG. 4, a block diagram of an embodiment of an inverse convolution filter is illustrated. In various embodiments, inverse convolution filter 400 may be included in current filter 209 or 309, in FIGS. 2 and 3, respectively. Inverse convolution filter 400 includes FIFO buffer 410, including portions 410a and 410b, and coefficient storage (coeffs) 412, including portions 412a and 412b. Both FIFO buffer 410 and coefficient storage 412 are coupled to multipliers 413a and 413b. Multipliers 413a and 413b are coupled to adders 414a and 414b, which are respectively coupled to summation registers (sum) 415a and 415b. Both summation registers 415a and 415b are coupled to adder 416, which, in turn, is coupled to current data register 417. Inverse convolution filter 400 receives filtered voltage level values 424 from a source such as LP filter 307 in SCM 302 of FIG. 3. Inverse convolution filter generates current values 422 as an output.

In the illustrated embodiment, inverse convolution filter 400 receives filtered voltage level values 424 and determines current values 422 based on one or more of the received values and coefficient values stored in coefficient storage 412. Operations performed by, and the coefficients used by, inverse convolution filter 400 are based on a process used to generate a power supply signal, such as, for example, voltage signal 119 in FIG. 1, that is generated by PDN 101. As previously described, PDN 101 generates voltage signal 119 from current signals received from power supply 109 via impedance circuit 111. Power supply 109 uses feedback from SoC 100 to adjust the provided current signal supplied to SoC 100, thus creating a cyclic process that results in current signal fluctuations. To mitigate fluctuations in voltage level on voltage signal 119, PDN 101 uses a transfer function for generating voltage signal 119 based on the received current from power supply 109. Using an inverse of this transfer function, a value for current may be generated based on a determined voltage level.

The transfer function used by PDN 101 may be represented in the time domain by equation 1.

$$v(t) = i(t) * h(t) \quad (1)$$

In equation 1, "v" represents voltage, "i" represents current, "t" represents time and "h" represents the transfer function. To determine current based on a known voltage value, equation 1 is solved for i(t), as shown in equation (2).

$$i(t) = v(t) * h^{-1}(t) \quad (2)$$

To determine current, therefore, $h^{-1}(t)$, i.e., the inverse transfer function, is calculated. To determine current using the inverse transfer function at a given point in time, a differentiation operation may be used. To simplify calculations, the time domain functions may be replaced by matrix domain functions. The inverse transfer function may be expressed as a circular, square N×N convolution matrix, H[T]. Similarly, voltage and current may be expressed as 1×M matrix vectors, V[T] and I[T], respectively. Substituting these matrix domain functions into equation 2 results in equation 3.

$$I[T] = V[T] * H^{-1}[T] \quad (3)$$

Determining a current vector, I[T], in the matrix domain, therefore, involves multiplying a determined voltage vector, V[T], by a matrix of the inverse transfer function, $H^{-1}[T]$. This is approximately equivalent to de-convolution of the voltage with impulse response. Since the inverse transfer matrix is of a circular, square form, the coefficients of a given row or column of $H^{-1}[T]$ may correspond to coefficients of a finite impulse response (FIR) filter. Convolving this FIR filter with a series of time-based voltage level values can determine corresponding current values.

In the illustrated embodiment, filtered voltage level values 424 received from LP filter 307 are stored in FIFO buffer 410. The values stored in FIFO buffer 410 represent V[T] from equation 3. Coefficients corresponding to $H^{-1}[T]$ are stored in coefficient storage 412. To determine I[T], each filtered voltage level value 424 is multiplied by a subset of the coefficients, one at a time, and added together. To increase the speed of the calculations, inverse convolution filter 400 divides FIFO buffer 410 and coefficient storage 412 in half, such that filtered voltage level values 424 stored in FIFO buffer 410a are multiplied by coefficients stored in coefficient storage 412a and filtered voltage level values 424 stored in FIFO buffer 410b are multiplied by coefficients stored in coefficient storage 412b. Multiplier 413a multiplies values from FIFO buffer 410a by coefficients from coefficient storage 412a. The product is added to summation register 415a by adder 414a. A similar process is performed in parallel to values from FIFO buffer 410b and coefficient storage 412b using multiplier 413b, adder 414b and summation register 415b. Values in summation registers 415a and 415b are then added together by adder 416 and stored in current data register 417. Current data register 417 provides the stored value as current values 422.

In various embodiments, FIFO buffer 410 and/or coefficient storage 412 may be included as part of inverse convolution filter 400 or separate from inverse convolution filter 400 as part of an SoC current monitoring circuit such as SCM 302 in FIG. 3. Inverse convolution filter 400 may receive a clock signal (not shown) to synchronize the operations performed on the values in FIFO buffer 410 and coefficient storage 412.

It is noted that FIG. 4 is merely one example embodiment. In other embodiments, additional circuits may be included. FIG. 4 is not intended to represent a physical arrangement of the illustrated circuits, merely a logical presentation.

Figure 5:
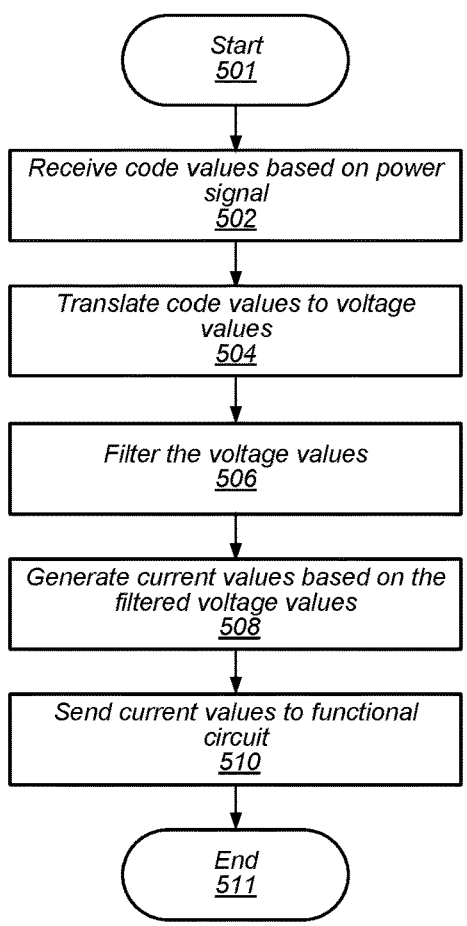
FIG. 5 shows a flowchart for an embodiment of a method for operating an SoC current monitoring circuit.

Moving to FIG. 5, a flowchart for an embodiment of a method for operating an SoC current monitoring circuit is shown. Method 500 may be applicable to an SoC current monitoring circuit, such as SCM 202 or SCM 302 in FIGS. 2 and 3, respectively, used to monitor current in an SoC such as SoC 100 in FIG. 1. Referring collectively to FIG. 1, FIG. 3, and method 500 of FIG. 5, the method may begin in block 501.

Code values that are based on a power signal are received (block 502). In the current embodiment, a monitoring circuit, such as, for example, voltage monitor 303, receives a plurality of code values that each indicates a voltage level of the power signal at a particular point in time. The plurality of code values may be received from a power distribution network, such as, for example, PDN 101 in FIG. 1. PDN 101 may generate the code values based on a process for generating a voltage signal for providing power to circuits in an SoC.

Code values are translated into voltage values (block 504). In the illustrated embodiment, the code values received by voltage monitor 303 are used to access entries in translation circuit 305. Each code value may have a respective entry in a memory in translation circuit 305 that corresponds to a particular voltage level. In some embodiments, translation circuit 305 may include additional entries for each code value. One entry may be selected based on a combination of the code value and an operating condition, such as, for example, a value from a temperature sensor.

The voltage values are filtered (block 506). The code values received by voltage monitor 303 may be received at a particular rate, corresponding to a sampling rate. The code values may be translated into voltage values at the same rate, using translation circuit 305. In the illustrated embodiment, the sampling rate of the voltage values may be reduced, or decimated, by using LP filter 307 to generate one decimated voltage value based on a number of voltage values from translation circuit 305. The number of voltage values used may be any suitable number, such as, for example, any number from 16 to 32. In such an embodiment, one decimated voltage value may be generated for every 32 voltage values from translation circuit 305. LP filter 307, in addition to decimating the voltage values, may filter the voltage values to attenuate high frequency changes in the voltage values, and thereby generating filtered voltage values. Sudden changes between two or more consecutive voltage values may be indicative of noise on the voltage signal. LP filter 307 attenuates such noise spikes so the longer-term power consumption of SoC 100 may be determined by SCM 302.

Current values are generated from the filtered voltage values (block 508). In the illustrated embodiment, current filter 309 receives the filtered voltage values from LP filter 307 and generates current values indicative of a current consumed in SoC 100. To determine current values from the filtered voltage values, current filter 309 may include an inverse convolution filter, such as inverse convolution filter 400 in FIG. 4. As described above, inverse convolution filter 400 may utilize coefficients whose values are based on the generation of voltage signal 119 by PDN 101. The coefficients may correspond to an inverse of a transfer function used to generate voltage signal 119 based on a current signal from a power supply. By applying these coefficients to the filtered voltage values, current values may be determined.

The current values are sent to at least one functional circuit (block 510). The current values generated by current filter may be sent to an interface such as interface 313. Interface 313 may be coupled to one or more functional blocks, for example, via a data bus. In some embodiments, interface 313 may include a register that may be accessed by the one or more functional circuits to retrieve a current value. The one or more functional circuits may utilize one or more of the current values to adjust an operating parameter, such as, for example, a frequency of a clock signal or level of a voltage signal. The method may end in block 511.

It is noted that method 500 of FIG. 5 is merely an example. Variations of the disclosed method are possible. For example, different numbers and different orders of the presented blocks may be employed. For example, in other embodiments, operations in blocks 506 and 508 may be in reverse order or may be completed in parallel.

Figure 6:
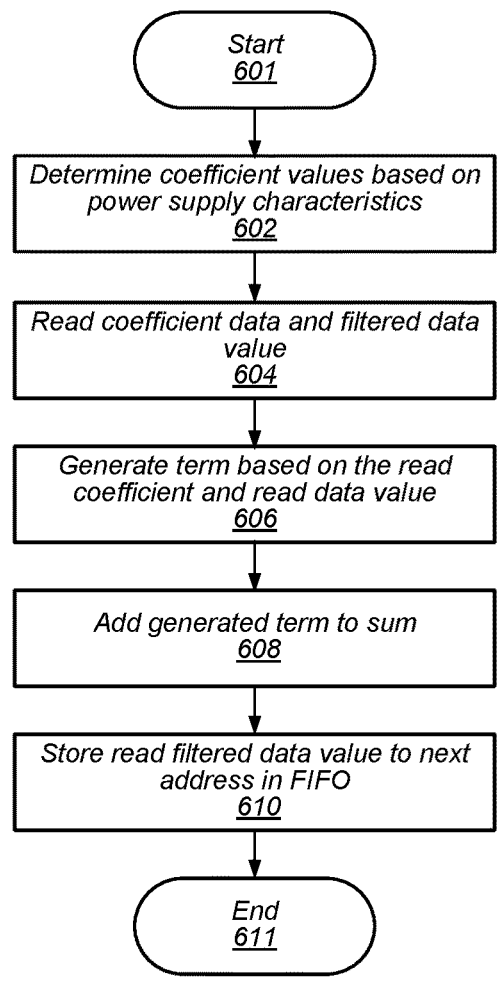
FIG. 6 illustrates a flowchart for an embodiment of a method for operating an inverse convolution filter.

Turning now to FIG. 6, a flowchart for an embodiment of a method for operating an inverse convolution filter is depicted. Method 600 may correspond to operations performed in block 510 of method 500 in FIG. 5. The operations of method 600 may be applicable to an inverse convolution filter, such as inverse convolution filter 400 in FIG. 4 that may be used in an SoC current monitoring circuit such as SCM 302 in FIG. 3, which is included in an SoC such as SoC 100 in FIG. 1. Referring collectively to SoC 100 of FIG. 1, inverse convolution filter 400 of FIG. 4, and method 600, the method may begin in block 601.

Coefficient values are determined based on power supply characteristics (block 602). In the illustrated embodiment, coefficients corresponding to a matrix of an inverse transfer function, such as shown above in equation 3. PDN 101 generates voltage signal 119 based on a current signal from power supply 109 using a transfer function that approximates the current signal as an impulse response. The coefficient values may be determined by calculating an inverse of this transfer function. The calculation of the coefficient values may occur during a design of SoC 100 based on simulations, or, in other embodiments, may be determined from empirical data collected on manufactured devices during testing or evaluation of SoC 100. During operation of SoC 100, the coefficient values are stored in a memory such as, for example, RAM 311 or coefficient storage 412.

A coefficient value and a filtered voltage level data value are read (block 604). In one embodiment, LP filter 307 filters voltage level values 323, and stores the values in FIFO buffer 310 as filtered voltage level values 324. In some embodiments, FIFO buffer 310 may correspond to FIFO buffer 410 in FIG. 4. Inverse convolution filter 400 reads a particular one of filtered voltage level values 324 from FIFO buffer 410, as well as a particular coefficient value from coefficient storage 412. If the particular filtered voltage level value 324 is read from FIFO buffer 410a, then the particular coefficient value is read from coefficient storage 412a, and vice versa if the particular filtered voltage level value 324 is read from FIFO buffer 410b.

A term is generated based on the read coefficient and the read filtered voltage level data value (block 606). In the illustrated embodiment, inverse convolution filter 400 multiplies the particular coefficient value and the particular filtered voltage level value 324 using either multiplier 413a or 413b. For example, if the values are read from FIFO buffer 410b and coefficient storage 412b, then multiplier 413b generates a product of the two values. The generated product is then added to summation register 415b using adder 414b.

The generated term is added to a sum (block 608). Continuing the example from above, inverse convolution filter 400 adds the generated term stored in sum 415b to another generated term stored in summation register 415a and stores the value in current data register 417. In various embodiments, each of summation registers 415a and 415b may include the addition of a number of filtered voltage level values 324 multiplied by respective coefficients before being added and stored in current data register 417 as one of current values 422.

The read filtered voltage level data value is stored in a next address in FIFO buffer 410 (block 610). Inverse convolution filter 400, in the illustrated embodiment, stores the particular filtered voltage level value 324 back into FIFO buffer 410 at a subsequent address to the address that the particular filtered voltage level value 324 was read from. Each value read from FIFO buffer 410 is shifted through addresses in FIFO buffer 410 such that each filtered voltage level value 324 may be multiplied by a different coefficient value each time it is read from FIFO buffer 410. A filtered voltage level value 324 read from a last address in FIFO buffer 410a may be stored back into a first address in FIFO buffer 410b, allowing, in some embodiments, each filtered voltage level value 324 to be multiplied by each coefficient stored in coefficient storage 412a and 412b. The method ends in block 611.

Method 600 of FIG. 6 is merely an example. In other embodiments, different operations and different numbers of operations are possible and contemplated. Operations may be performed in a different order and, in some embodiments, may be performed in parallel.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    a monitoring circuit configured to receive a plurality of digitally coded values, each digitally coded value indicative of a voltage level of a power supply signal included in a power distribution network of an integrated circuit at a respective point in time;
    a translation circuit configured to translate a particular digitally coded value of the plurality of digitally coded values to a corresponding digital voltage value of a plurality of digital voltage values;
    a first filter circuit configured to filter one or more of the plurality of digital voltage values to generate a plurality of filtered digital voltage values;
    a second filter circuit configured to generate a plurality of digital current values using one or more of the plurality of filtered digital voltage values and based on an impulse response of the power supply signal; and
    an interface configured to send one or more of the plurality of digital current values to a functional circuit.

2. The apparatus of claim 1, wherein the translation circuit is further configured to translate the particular digitally coded value using a temperature value.

3. The apparatus of claim 1, further comprising a memory, and
    wherein the first filter circuit is further configured to retrieve at least one coefficient value from the memory and filter the one or more of the plurality of digital voltage values using the at least one coefficient value.

4. The apparatus of claim 3, wherein the first filter circuit includes a finite impulse response filter, and wherein the at least one coefficient value is based on a cutoff frequency associated with the power supply signal.

5. The apparatus of claim 1, further comprising a memory, wherein the second filter circuit is further configured to retrieve data indicative of the impulse response of the power supply signal from the memory and generate the plurality of digital current values using the data.

6. The apparatus of claim 5, wherein the second filter circuit includes a finite impulse response filter, and wherein the data is indicative of an inverse convolution relationship between the voltage level of the power supply signal and an amount of current sourced by the power supply signal.

7. The apparatus of claim 1, wherein the functional circuit is configured to modify at least one operating parameter based on the one or more of the plurality of digital current values.

8. A method comprising:
    receiving, by a monitoring circuit, a plurality of digitally coded values, each digitally coded value indicating a voltage level of a power supply signal of an integrated circuit at a respective point in time;
    translating, by a translation circuit, a particular digitally coded value of the plurality of digitally coded values to corresponding digital voltage value of a plurality of digital voltage values;
    filtering, by a first filter circuit, one or more of the plurality of digital voltage values to generate a plurality of filtered digital voltage values;
    generating, by a second filter circuit, a plurality of digital current values using one or more of the plurality of filtered digital voltage values and based on an impulse response of the power supply signal; and
    modifying, by a functional circuit, at least one operating parameter based on a subset of the plurality of digital current values.

9. The method of claim 8, further comprising translating the particular digitally coded value using a temperature value.

10. The method of claim 8, further comprising retrieving at least one coefficient value from a memory and filtering the one or more of the plurality of digital voltage values using the at least one coefficient value.

11. The method of claim 8, wherein filtering the one or more of the plurality of digital voltage values comprises filtering the one or more of the plurality of digital voltage values based on a cutoff frequency associated with the power supply signal.

12. The method of claim 8, further comprising retrieving coefficient data indicative of the impulse response of the power supply signal from a memory and generating the plurality of digital current values using the coefficient data.

13. The method of claim 8, wherein generating the plurality of digital current values comprises filtering the plurality of digital current values using data based on an inverse convolution relationship between the voltage level of the power supply signal and an amount of current sourced by the power supply signal.

14. The method of claim 8, further comprising adjusting, by the functional circuit, a voltage level of a power supply signal based on the subset of the plurality of digital current values.

15. A system comprising:
    a power supply network configured to generate one or more power supply signals;
    at least one functional circuit; and
    a supply current monitoring circuit configured to:
        receive a plurality of digitally coded values, each digitally coded value indicating a voltage level of a power supply signal of a power distribution network in an integrated circuit at a respective point in time;
        translate a particular digitally coded value of the plurality of digitally coded values to a corresponding digital voltage value of a plurality of digital voltage values;
        filter one or more of the plurality of digital voltage values to generate a plurality of filtered digital voltage values;
        generate a plurality of digital current values using one or more of the plurality of filtered digital voltage values and based on an impulse response of the power supply signal; and
        send a subset of the plurality of digital current values to the functional circuit;
    wherein the functional circuit is configured to modify at least one operating parameter based on the subset of the plurality of digital current values.

16. The system of claim 15, wherein to translate a particular digitally coded value of the plurality of digitally coded values, the supply current monitoring circuit is further configured to translate the particular digitally coded value using a temperature value.

17. The system of claim 15, wherein the supply current monitoring circuit includes a memory, and wherein the supply current monitoring circuit is further configured to retrieve at least one coefficient value from the memory and filter the one or more of the plurality of digital voltage values using the at least one coefficient value.

18. The system of claim 17, wherein the supply current monitoring circuit includes a finite impulse response filter and wherein the at least one coefficient value is based on a cutoff frequency associated with at least one of the one or more power supply signals.

19. The system of claim 15, wherein the supply current monitoring circuit includes a memory, and wherein the supply current monitoring circuit is further configured to retrieve data indicative of the impulse response of at least one of the one or more power supply signals from the memory and generate the plurality of digital current values using the data.

20. The system of claim 19, wherein the supply current monitoring circuit includes a finite impulse response filter, and wherein the data is indicative of an inverse convolution relationship between the voltage level of the at least one power supply signal and an amount of current sourced by the at least one power supply signal.

* * * * *

UNITED STATES PATENT AND TRADEMARK OFFICE
CERTIFICATE OF CORRECTION

PATENT NO. : 10,296,063 B2
APPLICATION NO. : 15/474635
DATED : May 21, 2019
INVENTOR(S) : YangGong et al.

It is certified that error appears in the above-identified patent and that said Letters Patent is hereby corrected as shown below:

In the Drawings

On sheet 3 of 6, in FIG. 3, under Reference Numeral 321, Line 1, delete "temperatue" and insert -- temperature --, therefor.

Signed and Sealed this
Twenty-first Day of July, 2020

Andrei Iancu
*Director of the United States Patent and Trademark Office*